(12) United States Patent
Iwata et al.

(10) Patent No.: US 11,135,548 B2
(45) Date of Patent: Oct. 5, 2021

(54) COMPRESSED-AIR HEAT EXCHANGER, DEHUMIDIFICATION UNIT USING HEAT EXCHANGER, AND DEHUMIDIFICATION SYSTEM PROVIDED WITH DEHUMIDIFICATION UNIT

(71) Applicant: SMC CORPORATION, Chiyoda-ku (JP)

(72) Inventors: Tomoyuki Iwata, Moriya (JP); Tetsuo Sakaguchi, Matsudo (JP); Kunihide Fujii, Tsukubamirai (JP); Shunsuke Uchida, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 133 days.

(21) Appl. No.: 16/619,264

(22) PCT Filed: May 30, 2018

(86) PCT No.: PCT/JP2018/020654
§ 371 (c)(1),
(2) Date: Dec. 4, 2019

(87) PCT Pub. No.: WO2018/225592
PCT Pub. Date: Dec. 13, 2018

(65) Prior Publication Data
US 2020/0094185 A1    Mar. 26, 2020

(30) Foreign Application Priority Data

Jun. 8, 2017  (JP) .............................. JP2017-113688

(51) Int. Cl.
| | | |
|---|---|---|
| *B01D 53/26* | (2006.01) | |
| *F24F 3/14* | (2006.01) | |
| *B01D 53/06* | (2006.01) | |
| *F25B 39/02* | (2006.01) | |
| *F28D 21/00* | (2006.01) | |

(52) U.S. Cl.
CPC ............. *B01D 53/265* (2013.01); *F24F 3/14* (2013.01); *B01D 53/06* (2013.01); *B01D 2257/80* (2013.01); *F24F 2003/1446* (2013.01); *F25B 39/02* (2013.01); *F28D 2021/0038* (2013.01)

(58) Field of Classification Search
CPC .. B01D 53/265; B01D 53/06; B01D 2257/80; B01D 53/26; B01D 45/02; F24F 3/14; F24F 2003/1446; F28D 2021/0038
See application file for complete search history.

(56) References Cited

U.S. PATENT DOCUMENTS

| | | | |
|---|---|---|---|
| 4,287,724 A | 9/1981 | Clark | |
| 6,814,132 B1 | 11/2004 | Ike | |

FOREIGN PATENT DOCUMENTS

| | | | |
|---|---|---|---|
| JP | 56-7526 U | | 1/1981 |
| JP | 58-183228 U | | 12/1983 |
| JP | 3-87069 U | | 9/1991 |
| JP | 8-131754 A | | 5/1996 |
| JP | 2000-304474 A | | 11/2000 |
| JP | 2011-5374 A | | 1/2011 |
| JP | 2016203064 A | * | 12/2016 |
| WO | WO 2010/010591 A2 | | 1/2010 |

OTHER PUBLICATIONS

JP-2016203064-A translation.*
International Search Report dated Aug. 14, 2018 in PCT/JP2018/020654 filed May 30, 2018.

* cited by examiner

*Primary Examiner* — Elizabeth J Martin
(74) *Attorney, Agent, or Firm* — Oblon, McClelland, Maier & Neustadt, L.L.P.

(57) ABSTRACT

A heat exchange flow path portion is formed by alternately winding two spirally-shaped first and second heat transfer walls, with a predetermined gap interposed therebetween in the radial direction of the flow path pipe, around the outer periphery of a cylindrical flow path pipe, in which a cooling heat source is disposed in a main heat transfer flow path inside thereof. An inlet flow path and an outlet flow path for introducing compressed air into the flow path pipe and discharging compressed air from the flow path pipe are alternately formed, in the radial direction, from the gap between the heat transfer walls. Heat exchange is performed between compressed air that flows in the flow path and compressed air that flows in the flow path.

14 Claims, 8 Drawing Sheets

COMPRESSED-AIR HEAT EXCHANGER, DEHUMIDIFICATION UNIT USING HEAT EXCHANGER, AND DEHUMIDIFICATION SYSTEM PROVIDED WITH DEHUMIDIFICATION UNIT

TECHNICAL FIELD

The present invention relates to a compressed air heat exchanger that is used, for example, to dehumidify compressed air by cooling the compressed air, a compressed air dehumidification unit using the heat exchanger, and a compressed air dehumidification system provided with the dehumidification unit.

BACKGROUND ART

As disclosed in Patent Literatures (PTL 1 and PTL 2), a dehumidification unit that dehumidifies compressed air introduced from the outside by cooling the compressed air, that reheats (reduces the coolness of) the compressed air after dehumidification (after cooling) by heat exchange with compressed air before dehumidification (before cooling), and that discharges the compressed air to the outside is already known. The dehumidification unit includes: a main cooling portion that is provided with a refrigerant pipe and that dehumidifies introduced compressed air by cooling the compressed air; and a heat exchange portion that pre-cools (supplementarily cools) compressed air before dehumidification and that reheats compressed air after dehumidification by causing heat exchange to be performed between the compressed air before dehumidification and the compressed air after dehumidification.

In the existing dehumidification unit disclosed in each of the PTLs, the main cooling portion and the heat exchange portion, which extend in the axial direction, are independently and individually formed, the heat exchange portion is disposed on the main cooling portion, and flow paths of the compressed air passing through the main cooling portion and the heat exchange portion are connected to each other at both end parts in the axial direction. However, when such a structure is used, for example, it is necessary to reverse the flow of compressed air multiple times in the axial direction from the time when compressed air is introduced into the dehumidification unit to the time when the compressed air is discharged. Thus, the flow path arrangement for compressed air in the dehumidification unit tends to become complex and inefficient. As a result, the size of the dehumidification unit may increase or the pressure loss of compressed air may increase.

CITATION LIST

Patent Literature

PTL 1: Japanese Unexamined Patent Application Publication No. 2011-5374
PTL 2: Japanese Unexamined Patent Application Publication No. 8-131754

SUMMARY OF INVENTION

Technical Problem

A technological object of the present invention is to provide a compressed air heat exchanger in which flow path arrangement is made more efficient, a compressed air dehumidification unit using the heat exchanger, and a dehumidification system provided with the dehumidification unit.

Solution to Problem

To achieve the object, a first invention of the present application is a compressed air heat exchanger, the heat exchanger including: a cylindrical flow path pipe that includes a first end at one end in an axial direction and a second end at the other end in the axial direction and that causes heat exchange to be performed between a heat source and compressed air in a main heat transfer flow path inside thereof, and a heat exchange flow path portion that includes an inlet flow path for introducing compressed air from an outside into the main heat transfer flow path and an outlet flow path for discharging compressed air after heat exchange to the outside from the main heat transfer flow path and that causes heat exchange to be performed between compressed air that flows in the inlet flow path and compressed air that flows in the outlet flow path. The heat exchange flow path portion includes a first heat transfer wall and a second heat transfer wall each of which has a spiral shape, an inner end of each of the first heat transfer wall and the second heat transfer wall is hermetically fixed to an outer periphery of the flow path pipe, the first heat transfer wall and the second heat transfer wall are alternately wound around the outer periphery of the flow path pipe in a state in which a predetermined gap is interposed therebetween, and the inlet flow path and the outlet flow path are alternately formed from the gap between the first heat transfer wall and the second heat transfer wall. In an outer peripheral part of the heat exchange flow path portion, an inlet opening for allowing compressed air from the outside to flow into the inlet flow path and an outlet opening for allowing compressed air to flow out from the outlet flow path are formed. An inflow opening through which the inlet flow path and the main heat transfer flow path communicate with each other is formed on the first end side of the flow path pipe, and an outflow opening through which the main heat transfer flow path and the outlet flow path communicate with each other is formed on the second end side of the flow path pipe.

In the heat exchanger, preferably, each of the first heat transfer wall and the second heat transfer wall includes a plurality of convex fins each of which is made by forming a recess in one of inner and outer surfaces thereof and forming a projection on the other surface thereof. More preferably, an opening edge of the recess of each of the convex fins is chamfered in a substantially circular shape, and an angle between an inner surface of the recess and the one surface of the heat transfer wall at the opening edge is larger than 90 degrees, and a depth of the recess is smaller than a radius of the opening edge.

In the heat exchanger, preferably, the inner ends of the first heat transfer wall and the second heat transfer wall are fixed to the outer periphery of the flow path pipe so as to be separated from each other by 180 degrees, and outer ends of the first heat transfer wall and the second heat transfer wall are disposed in an outer peripheral part of the heat exchange flow path portion so as to be separated from each other by 180 degrees. More preferably, the inner ends and the outer ends of the first heat transfer wall and the second heat transfer wall are disposed on a same plane that includes an axis of the flow path pipe, and the inflow opening and the outflow opening are respectively formed in one angular range and the other angular range in the flow path pipe that are located with the plane interposed therebetween.

To achieve the object, a second invention of the present application is a dehumidification unit for dehumidifying compressed air, the dehumidification unit including: a cooling heat source; a heat exchanger for reheating compressed air, cooled and dehumidified by the cooling heat source, by heat exchange with compressed air before dehumidification; and a hollow case in which the heat exchanger and the cooling heat source are contained. The heat exchanger includes a cylindrical flow path pipe that includes a first end at one end in an axial direction and a second end at the other end in the axial direction and in which the cooling heat source is disposed in a main heat transfer flow path inside thereof, and a heat exchange flow path portion that includes an inlet flow path for introducing compressed air from an outside into the main heat transfer flow path and an outlet flow path for discharging compressed air after dehumidification, cooled in the main heat transfer flow path, to the outside and that causes heat exchange to be performed between compressed air that flows in the inlet flow path and compressed air that flows in the outlet flow path. The heat exchange flow path portion includes a first heat transfer wall and a second heat transfer wall each of which has a spiral shape, an inner end of each of the first heat transfer wall and the second heat transfer wall is hermetically fixed to an outer periphery of the flow path pipe, the first heat transfer wall and the second heat transfer wall are alternately wound around the outer periphery of the flow path pipe in a state in which a predetermined gap is interposed therebetween, and the inlet flow path and the outlet flow path are alternately formed from the gap between the first heat transfer wall and the second heat transfer wall. In an outer peripheral part of the heat exchange flow path portion, an inlet opening for allowing compressed air to be dehumidified to flow into the inlet flow path and an outlet opening for allowing compressed air after dehumidification to flow out from the outlet flow path are formed. An inflow opening through which the inlet flow path and the main heat transfer flow path communicate with each other is formed on the first end side of the flow path pipe, and an outflow opening through which the main heat transfer flow path and the outlet flow path communicate with each other is formed on the second end side of the flow path pipe. In the case, an input port that communicates with the inlet opening of the heat exchanger, an output port that communicates with the outlet opening of the heat exchanger, and a drain discharge port that communicates with the second end side of the main heat transfer flow path and through which drain water generated in the heat exchanger is discharged to the outside are formed.

In the dehumidification unit, preferably, a hollow space is formed between a periphery of the heat exchanger and the case, and the hollow space is divided by a first separation wall and a second separation wall into three spaces, which are a first space on the first end side, a second space on the second end side, and a third space interposed between the first space and the second space; and one of connection between the input port and the inlet opening and connection between the output port and the outlet opening is made via the first space and the other of the connections is made via the third space, and the second end side of the main heat transfer flow path is connected to the drain discharge port via the second space. At this time, more preferably, the input port and the output port are disposed at positions higher than the drain discharge port. Further preferably, the input port and the inlet opening are connected via the first space, and the output port and the outlet opening are connected via the third space; an outer end of the first heat transfer wall is hermetically fixed to the second heat transfer wall adjacent to an inside of the first heat transfer wall, and the inlet opening is formed in an outermost wall portion of the first heat transfer wall disposed on an outermost side; and the outlet opening is formed from a gap formed between an outer end of the second heat transfer wall and the first heat transfer wall adjacent to an inside of the outer end.

In the dehumidification unit, preferably, the inner end of the first heat transfer wall and the inner end of the second heat transfer wall are fixed to the outer periphery of the flow path pipe so as to be separated from each other by 180 degrees, and an outer end of the first heat transfer wall and an outer end of the second heat transfer wall are disposed in an outer peripheral part of the heat exchange flow path portion so as to be separated from each other by 180 degrees. More preferably, the inner end and the outer end of the first heat transfer wall and the inner end and the outer end of the second heat transfer wall are disposed on a single plane that includes an axis of the flow path pipe, and the inflow opening and the outflow opening are respectively formed in one angular range and the other angular range in the flow path pipe that are located with the plane interposed therebetween. At this time, further preferably, the outflow opening is formed in an angular range of the flow path pipe that is located on an opposite side from the drain discharge port with the plane interposed therebetween. In the dehumidification unit, the cooling heat source is a refrigerant pipe that is inserted into the main heat transfer flow path from the first end of the flow path pipe and through which a refrigerant flows.

To achieve the object, a dehumidification system provided with the dehumidification unit according to the present invention includes a refrigeration circuit that causes a refrigerant decompressed by a decompressor to flow to the refrigerant pipe, and that circulates a refrigerant that has performed heat exchange with compressed air in the main heat transfer flow path by causing the refrigerant to flow to the decompressor again through a compressor and a condenser. An auto-drain is connected to the drain discharge port of the dehumidification unit.

Advantageous Effects of Invention

In the heat exchanger according to the present invention, the heat exchange flow path portion is formed by alternately winding the two spirally-shaped heat transfer walls around the outer periphery of the cylindrical flow path pipe of the main heat transfer flow path in the radial direction of the flow path pipe with a predetermined gap interposed therebetween. The inlet flow path and the outlet flow path, for introducing compressed air into and discharging compressed air from the flow path pipe, are alternately formed, in the radial direction, from the gap between the heat transfer walls. Therefore, while maintaining high efficiency in heat exchange by using counter flows in the heat exchange flow path portion, it is possible to realize more efficient flow path arrangement for compressed air by avoiding complexity in flow path arrangement by, for example, reducing the number of times the flow of compressed air is reversed in the axial direction. That is, with the present invention, it is possible to provide a compressed air heat exchanger in which flow path arrangement is made more efficient, a compressed air dehumidification unit using the heat exchanger, and a dehumidification system provided with the dehumidification unit.

BRIEF DESCRIPTION OF DRAWINGS

FIG. 6(a) illustrates flows in recesses, and FIG. 6(b) illustrates flows around projections.

DESCRIPTION OF EMBODIMENTS

Hereafter, a heat exchanger 1, a dehumidification unit 2 using the heat exchanger 1, and a dehumidification system 100 provided with the dehumidification unit 2 according to a first embodiment of the present invention will be described.

Figure 1:
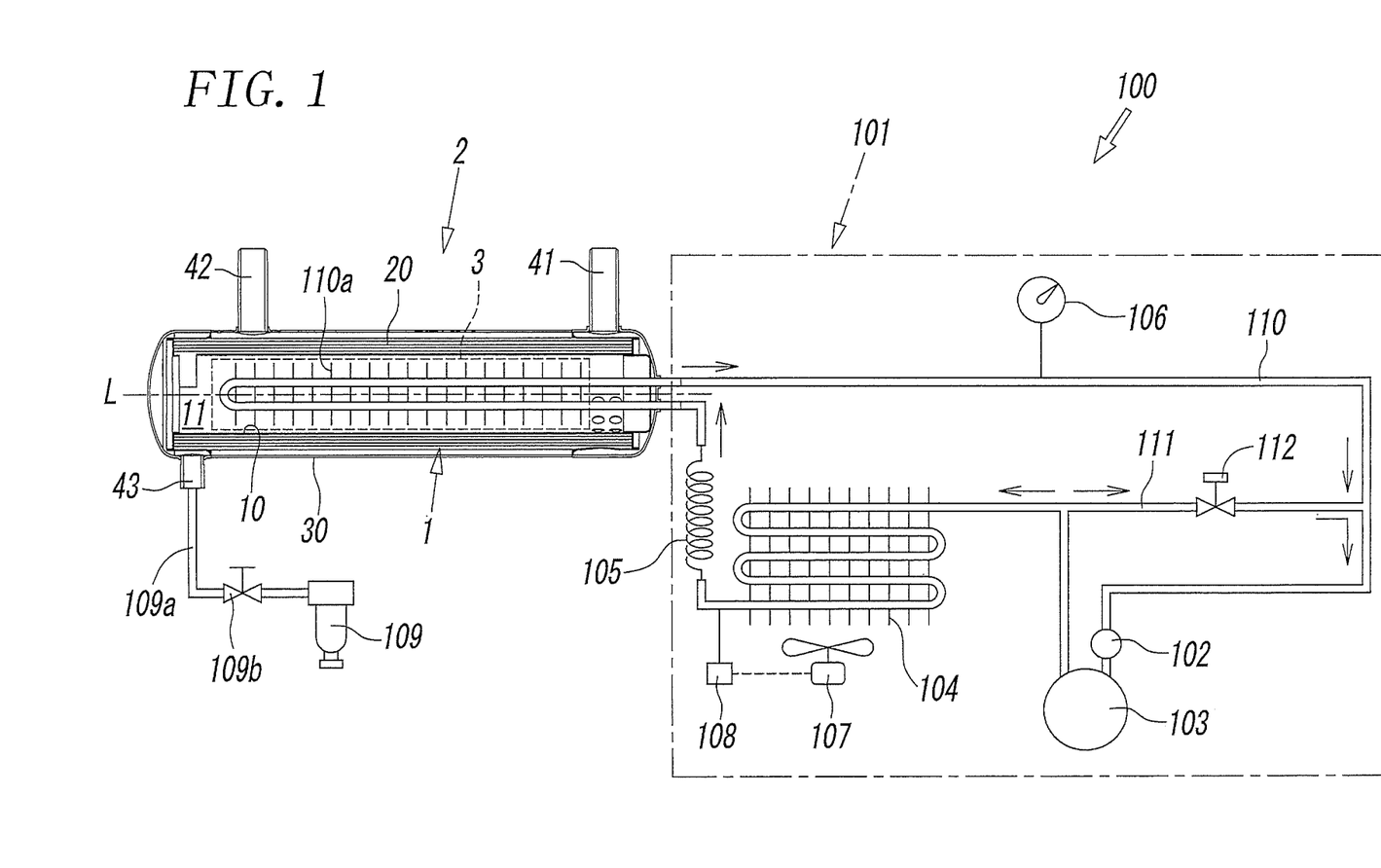
FIG. 1 is a schematic view of a dehumidification system provided with a dehumidification unit according to the present invention.
Figure 2:
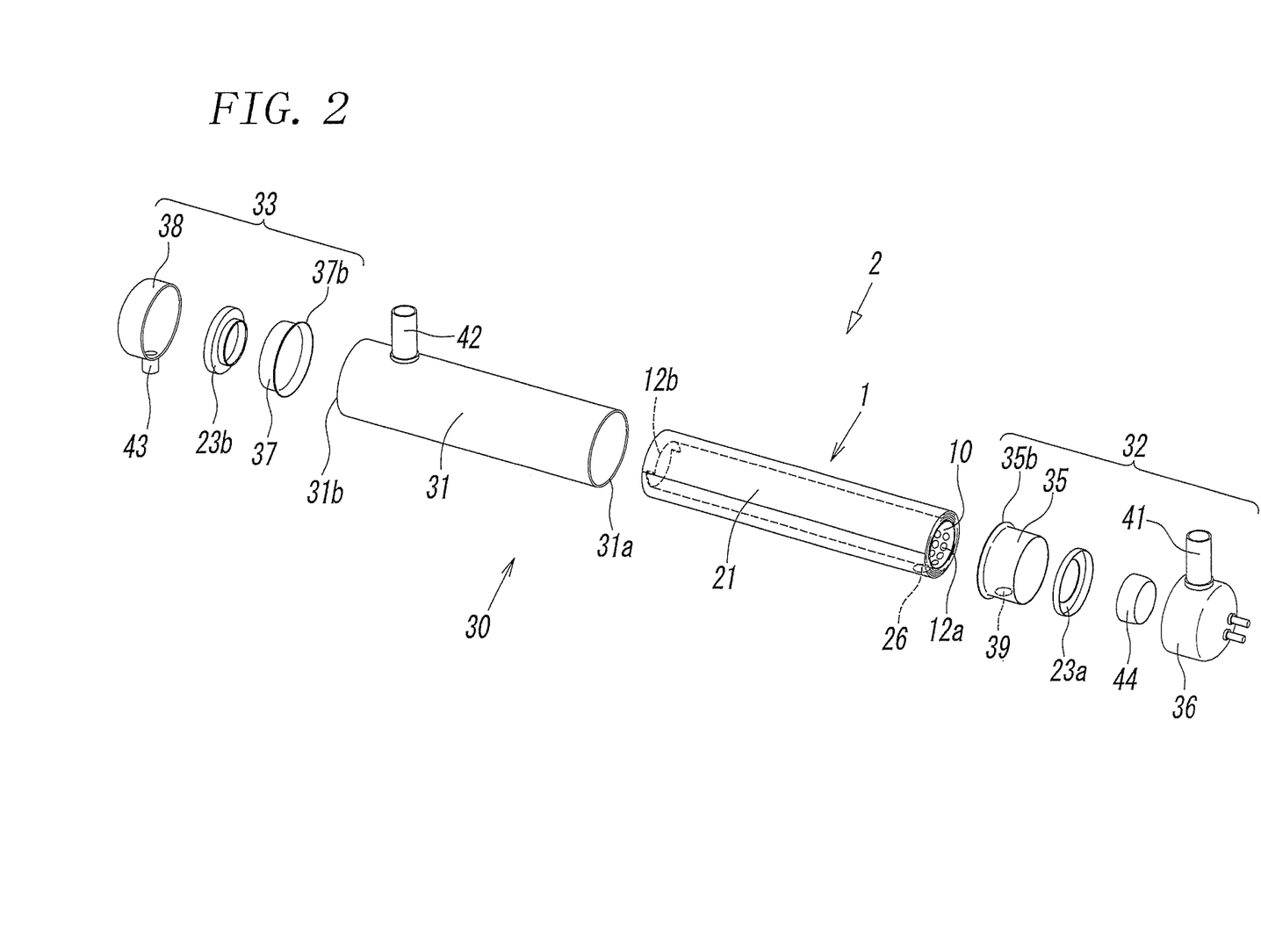
FIG. 2 is an exploded perspective view of the dehumidification unit using a heat exchanger according to the present invention.

As illustrated in FIG. 1, the dehumidification system 100 includes the dehumidification unit 2, which contains the heat exchanger 1 and an evaporator 3 as a cooling heat source; a refrigeration circuit 101 for causing a refrigerant to flow back to a refrigerant pipe 110 of the evaporator 3; and an auto-drain 109 for accumulating drain water discharged from the dehumidification unit 2. Compressed air to be dehumidified, which is introduced into the dehumidification unit 2 from the outside, is dehumidified by being cooled by the evaporator 3. The compressed air after dehumidification is reheated (that is, coolness is reduced) by exchanging heat with compressed air before dehumidification in the heat exchanger 1. Then, the compressed air is discharged to the outside of the dehumidification unit 2.

Here, the refrigeration circuit 101 includes an accumulator 102 that separates liquid and vapor of a refrigerant, a compressor 103 that compresses the refrigerant, a condenser 104 that condenses the refrigerant compressed by the compressor and that releases condensation heat from the refrigerant, and a capillary tube 105 as a decompressor that decompresses the refrigerant. The accumulator 102, the compressor 103, the condenser 104, and the capillary tube 105 are each made of a metal such as copper and are connected in series via the refrigerant pipe 110, through which refrigerant flows.

On the primary side of the compressor 103, a thermometer 106 for measuring the temperature of a refrigerant discharged from the dehumidification unit 2 is disposed. Between the condenser 104 and the capillary tube 105, a pressure switch 108 that drives a fan 107 for blowing external air to the condenser 104 is disposed. In the refrigerant pipe 110 between the compressor 103 and the condenser 104, a branch pipe 111 for returning a part of a refrigerant compressed by the compressor 103 to the primary side of the compressor 103 is disposed. At this time, the flow rate of the refrigerant in the branch pipe 111 is adjusted by using a volume regulating valve 112 disposed in the branch pipe 111.

That is, in the refrigeration circuit 101, first, a refrigerant evaporated by exchanging heat with compressed air in the dehumidification unit 2 is compressed by the compressor 103. Next, a part of the refrigerant compressed by the compressor 103 is returned to the primary side of the compressor 103 through the branch pipe 111, and the remaining part of the refrigerant is introduced into the condenser 104. Next, the refrigerant introduced into the condenser 104 is cooled and liquefied by exchanging heat with airflow generated by the fan 107. The refrigerant liquefied by the condenser 104 is decompressed by the capillary tube 105, and the decompressed refrigerant is caused to flow back to the refrigerant pipe 110 of the evaporator 3 disposed in the dehumidification unit 2.

At this time, drain water that is generated in the dehumidification unit 2 by dehumidifying the compressed air is accumulated in the auto-drain 109 through a drain discharge pipe 109a connected to the dehumidification unit 2. For example, by using an appropriate parameter, such as the amount of drain water accumulated in the auto-drain 109 or time, as a trigger, the accumulated drain water is discharged from the auto-drain 109 by using the pressure of compressed air that is supplied from the dehumidification unit 2 through the drain discharge pipe 109a. The auto-drain 109 is connected to the dehumidification unit 2 via a ball valve 109b. The ball valve 109b is normally open, and is closed when performing maintenance of the auto-drain 109 or the like.

As illustrated in FIG. 1, the dehumidification unit 2, which is installed in the dehumidification system 100, includes, in addition to the heat exchanger 1 and the evaporator 3, a hollow case 30 for containing these. The case 30 is made of a metal such as a stainless steel. In the case 30, the following ports are formed: an input port 41 that is connected to an air-pressure source such as an external compressor and through which compressed air to be dehumidified is input to the dehumidification unit 2; an output port 42 through which compressed air that is cooled and dehumidified by the evaporator 3 and that is reheated (coolness is reduced) by exchanging heat with compressed air before dehumidification in the heat exchanger 1 is output to an external air-pressure device or the like connected thereto; and a drain discharge port 43 that is connected to the drain discharge pipe 109a to be coupled to the auto-drain 109 and thereby discharges drain water generated by dehumidification in the dehumidification unit 2 to the auto-drain 109. The drain discharge port 43 is formed so as to extend vertically downward from the lowest position in the case 30. The input port 41 and the output port 42 are formed at positions higher than the drain discharge port 43. By arranging the ports in this way, drain after separation is prevented from being remixed into compressed air before and after dehumidification in the dehumidification unit 2.

The dehumidification unit 2 will be described in further detail. As illustrated in FIGS. 2 to 5, the heat exchanger 1 includes a cylindrical flow path pipe 10 that extends in the axis-L direction, and a heat exchange flow path portion 20 that is wound around an outer peripheral surface of the flow path pipe 10 extending along the axis L.

The flow path pipe 10 is made of, for example, a metal such as a stainless steel, aluminum, or copper, and has a hollow shape both ends of which are open. The flow path pipe 10 has a first end 13 and a first opening 15 at one end thereof in the axis-L direction, and a second end 14 and a second opening 16 at the other end thereof in the axis-L direction. The evaporator 3 is disposed in the flow path pipe 10, and thus a main heat transfer flow path (main cooling flow path) 11 is formed in the flow path pipe 10. The main heat transfer flow path 11 causes heat exchange to be performed between the evaporator 3 and compressed air that flows therethrough (to be specific, cools compressed air to be dehumidified, which is input from the input port 41, by using the evaporator 3). That is, here, the main heat transfer flow path 11 is formed from a single cylindrical space that is defined by the inner peripheral surface of the flow path pipe 10 having a circular cross-sectional shape. By disposing the evaporator 3 in the main heat transfer flow path 11 in this way, in the main heat transfer flow path 11, water included in the compressed air to be dehumidified is condensed by being cooled and removed as the drain water. As a result, the compressed air is dehumidified.

Figure 3:
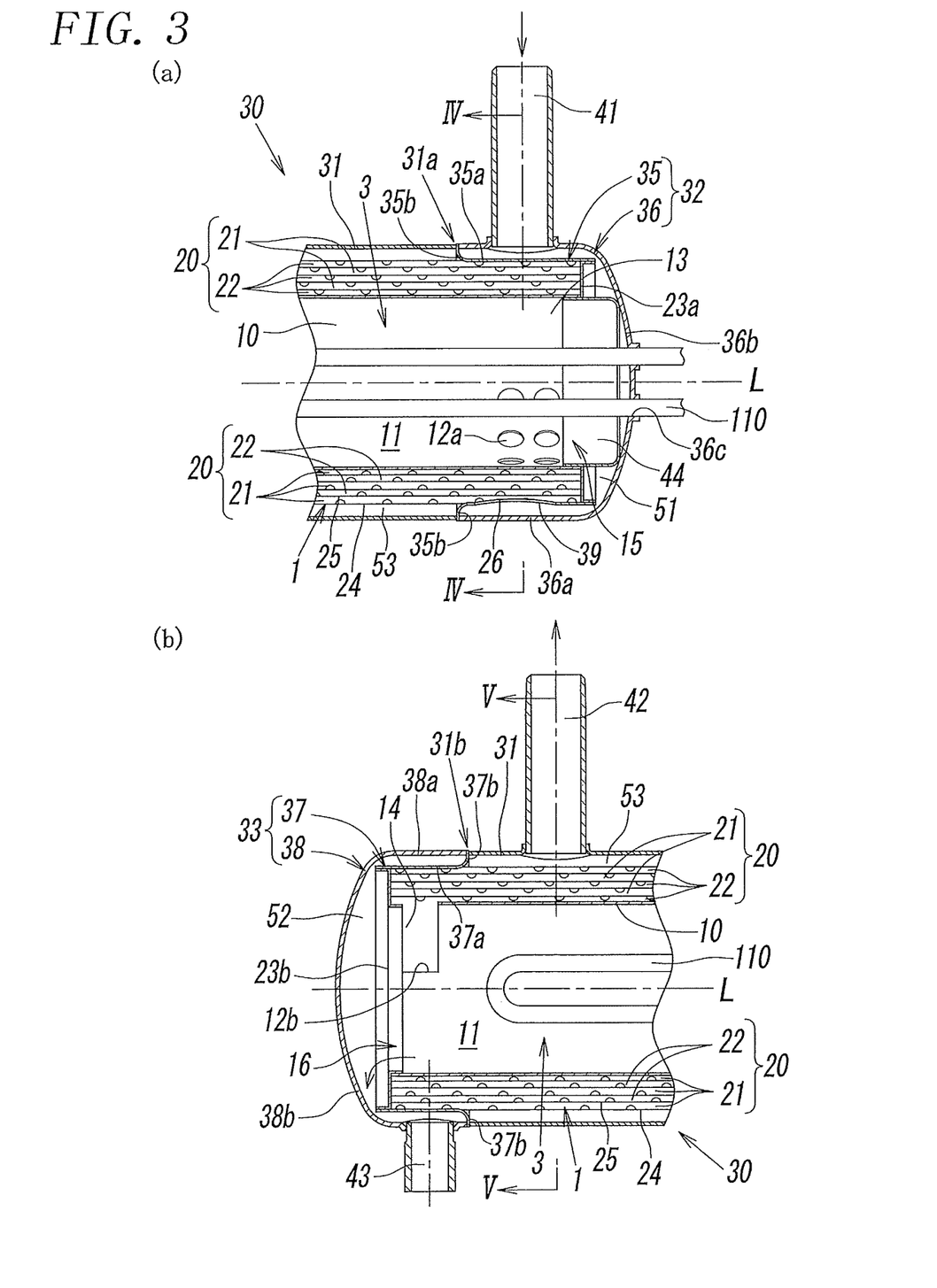
FIG. 3(a) is a partial enlarged view of the dehumidification unit using the heat exchanger according to the present invention on a first end side taken along an axis L.
FIG. 3(b) is a partial enlarged view on a second end side taken along the axis L.

The refrigerant pipe 110 of the evaporator 3 is made of a metal such as copper or aluminum. As illustrated in FIG. 3, the refrigerant pipe 110 is inserted into the main heat transfer flow path 11 along the axis L from the first opening 15 of the flow path pipe 10 on the first end 13 side. At this time, preferably, a plurality of fins 110a are attached to the outer periphery of the refrigerant pipe 110 of the evaporator 3 in order to improve the efficiency in heat exchange between a refrigerant and compressed air and to accelerate condensation of water. As the fins 110a, for example, plate fins or spine fins, which extend radially from the outer peripheral surface of the refrigerant pipe 110, are preferably used. Although the fins 110a are preferably made of aluminum, the fins 110a may be made of another metal having high heat transfer performance, such as copper.

On the other hand, the heat exchange flow path portion 20 includes two heat transfer walls each of which has a spiral cross-sectional shape and has a length substantially the same as the length of the flow path pipe 10 in the axis-L direction, that is, a first heat transfer wall 24 and a second heat transfer wall 25. The first heat transfer wall 24 and the second heat transfer wall 25 have a first inner end 24a and a second inner end 25a, which are located on the innermost side, and a first outer end 24b and a second outer end 25b, which are located on the outermost side. The first inner end 24a and the second inner end 25a are hermetically fixed along the axis L to substantially opposite positions on the outer peripheral surface of the flow path pipe 10 that are separated from each other by approximately 180 degrees by fixing means such as welding. The heat transfer walls 24 and 25 are alternately wound multiple times in the entire radial direction perpendicular to the axis L of the flow path pipe 10, that is, around the entire outer periphery of the flow path pipe 1 in a state in which a predetermined gap is interposed therebetween.

Thus, double spirally-shaped flow paths are formed around the flow path pipe 10. One of the flow paths forms an inlet flow path 21 for guiding compressed air to be dehumidified, which is input from the input port 41, to the main heat transfer flow path 11 of the flow path pipe 10. The other flow path forms an outlet flow path 22 for guiding compressed air after dehumidification, which has been cooled and dehumidified in the main heat transfer flow path 11, to the output port 42.

Figure 4:
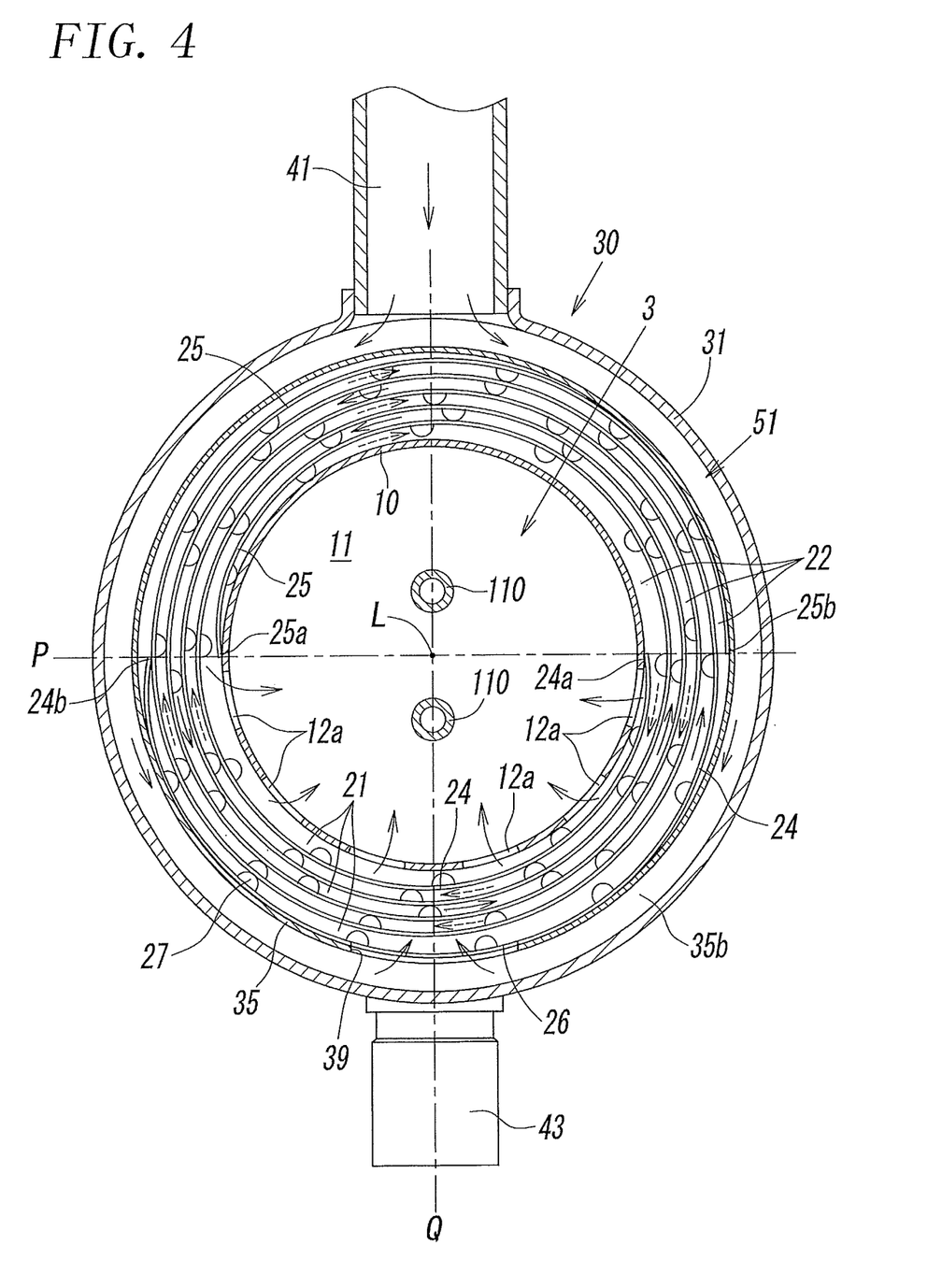
FIG. 4 is a sectional view of the dehumidification unit using the heat exchanger according to the present invention taken along line IV-IV in FIG. 3(a).
Figure 5:
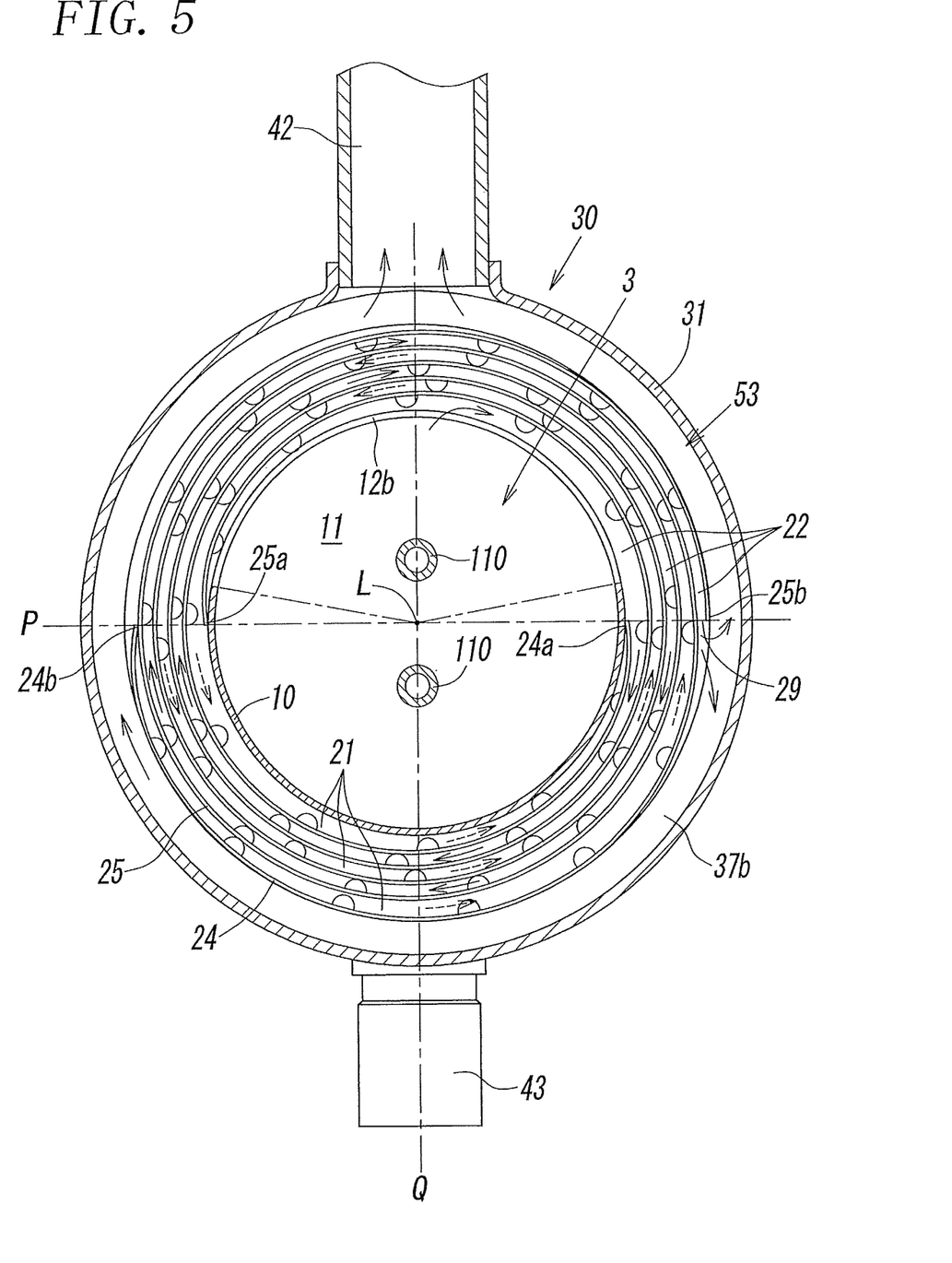
FIG. 5 is a sectional view of the dehumidification unit using the heat exchanger according to the present invention taken along line V-V in FIG. 3(b).

That is, as illustrated in FIGS. 4 and 5, by being wound multiple times around the flow path pipe 10, the inlet flow path 21 and the outlet flow path 22 are disposed so as to be alternately superposed on each other in multiple layers around the entire periphery of the flow path pipe 10. Heat exchange is performed between high-temperature compressed air before dehumidification, which flows in the inlet flow path 21, and low-temperature compressed air after dehumidification, which flows in the outlet flow path 22 in a direction counter to the flow of the high-temperature compressed air. As a result, in the heat exchange flow path portion 20, compressed air after dehumidification, which has been cooled in the main heat transfer flow path 11, is reheated (coolness is reduced), and, at the same time, compressed air before dehumidification, which is input from the input port 41, is preliminarily cooled (pre-cooled). At this time, drain water may be generated in the inlet flow path 21 due to the preliminary cooling. However, the drain water is moved by compressed air to the main heat transfer flow path 11 and discharged from the drain discharge port 43.

It is only necessary that the material of the first and second heat transfer walls 24 and 25 be a material that allows heat exchange to be performed between compressed air before dehumidification, which flows in the inlet flow path 21, and compressed air after dehumidification, which flows in the outlet flow path 22. The material may be, for example, a metal such as a stainless steel, copper, or aluminum.

As illustrated in FIGS. 4 and 5, within angular ranges of approximately 180 degrees in directions in which the heat transfer walls 24 and 25 are respectively wound from the first inner end 24a of the first heat transfer wall 24 and the second inner end 25a of the second heat transfer wall 25, an inner peripheral end part of the inlet flow path 21 and an inner peripheral end part of the outlet flow path 22 are respectively formed between the outer surface of the flow path pipe 10 and the first heat transfer wall 24 and between the outer surface of the flow path pipe 10 and the second heat transfer wall 25. That is, below a plane P that includes the first inner end 24a and the second inner end 25a, the inner peripheral end part of the inlet flow path 21 is formed at a position directly adjacent to the flow path pipe 10; and, above the plane P, the inner peripheral end part of the outlet flow path 22 is formed at a position directly adjacent to the flow path pipe 10.

Near the first end 13 of the flow path pipe 10, inflow openings 12a, through which the inlet flow path 21 and the main heat transfer flow path 11 communicate with each other, are formed in an angular range that is in direct contact with the inlet flow path 21 (a lower half below the plane P). Near the second end 14 the flow path pipe 10, an outflow opening 12b, through which the main heat transfer flow path 11 and the outlet flow path 22 communicate with each other, is formed in an angular range that is in direct contact with the outlet flow path 22 (an upper half above the plane P). In order to prevent drain from being remixed into compressed air after dehumidification, preferably, the angular range in which the outflow opening 12b is formed is located on the opposite side from the drain discharge port 43 with the plane P interposed therebetween. Here, as illustrated in FIG. 4, the inflow openings 12a are formed of a plurality of holes extending through the flow path pipe 10, which are specifically six circular holes arranged in each of two rows. The outflow opening 12b is formed by cutting out the flow path pipe 10 in a sectoral shape around the axis L with a predetermined width from the second end 14. Here, as illustrated in FIG. 5, the central angle of the sectoral shape is an obtuse angle larger than 90 degrees. However, the number and the shape of the inflow openings 12a and the outflow opening 12b are not limited to these.

In an outer peripheral part of the heat exchange flow path portion 20, an inlet opening 26 for allowing compressed air to be dehumidified, which is input from the input port 41, to flow into the inlet flow path 21 is formed, and an outlet opening 29 for allowing compressed air after dehumidification to flow out from the outlet flow path 22 to the output port 42 is formed. To be specific, on the plane P, the first outer end 24b of the first heat transfer wall 24 is disposed at a position on the opposite side from the first inner end 24a with the axis L interposed therebetween, and the second outer end 25b of the second heat transfer wall 25 is disposed at a position on the opposite side from the second inner end 25a with the axis L interposed therebetween. That is, the outer ends 24b and 25b are disposed at substantially opposite positions on the outer peripheral surface of the heat exchange flow path portion 20 that are separated from each other by approximately 180 degrees. The first inner end 24a and the first outer end 24b of the first heat transfer wall 24 and the second inner end 25a and the second outer end 25b of the second heat transfer wall 25 are substantially disposed on the single plane P that includes the axis L.

As a result, as illustrated in FIGS. 4 and 5, in the angular ranges respectively backward, in the direction opposite to the winding direction of the heat transfer walls 24 and 25, from the first outer end 24b of the first heat transfer wall 24 and the second outer end 25b of the second heat transfer wall 25 by approximately 180 degrees, outer peripheral parts of the heat exchange flow path portion 20, that is, outer peripheral end parts of the inlet flow path 21 and the outlet flow path 22 are respectively formed from outermost wall portions of the first heat transfer wall 24 and the second heat transfer wall 25 disposed on the outermost side.

To be specific, below the plane P, the outer peripheral end part of the inlet flow path 21 is formed between an outermost wall portion of the first heat transfer wall 24 and the second heat transfer wall 25 directly adjacent to the inside thereof. The outer peripheral end part of the inlet flow path 21 is closed by hermetically fixing the first outer end 24b of the first heat transfer wall 24 to the outer peripheral surface of the second heat transfer wall 25 directly adjacent to the inside thereof, along the axis L by welding or the like. In the outermost wall portion of the first heat transfer wall 24, the inlet opening 26, having a circular shape, is formed near the first end 13 so as to face in a direction perpendicular to the plane P (the downward direction in the figure).

Above the plane P, the outer peripheral end part of the outlet flow path 22 is formed between the outermost wall portion of the second heat transfer wall 25 and the first heat transfer wall 24 directly adjacent to the inside thereof. The outer peripheral end part of the outlet flow path 22 is open because the second outer end 25b of the second heat transfer wall 25 is not hermetically fixed to the outer peripheral end part of the first heat transfer wall 24 directly adjacent to the inside thereof. The outlet opening 29, which communicates with a third space 53, is formed from a gap formed between the second outer end 25b and the first heat transfer wall 24. As with the inlet opening 26, the outlet opening 29 is formed in the direction perpendicular to the plane P (the downward direction in the figure).

Figure 6:
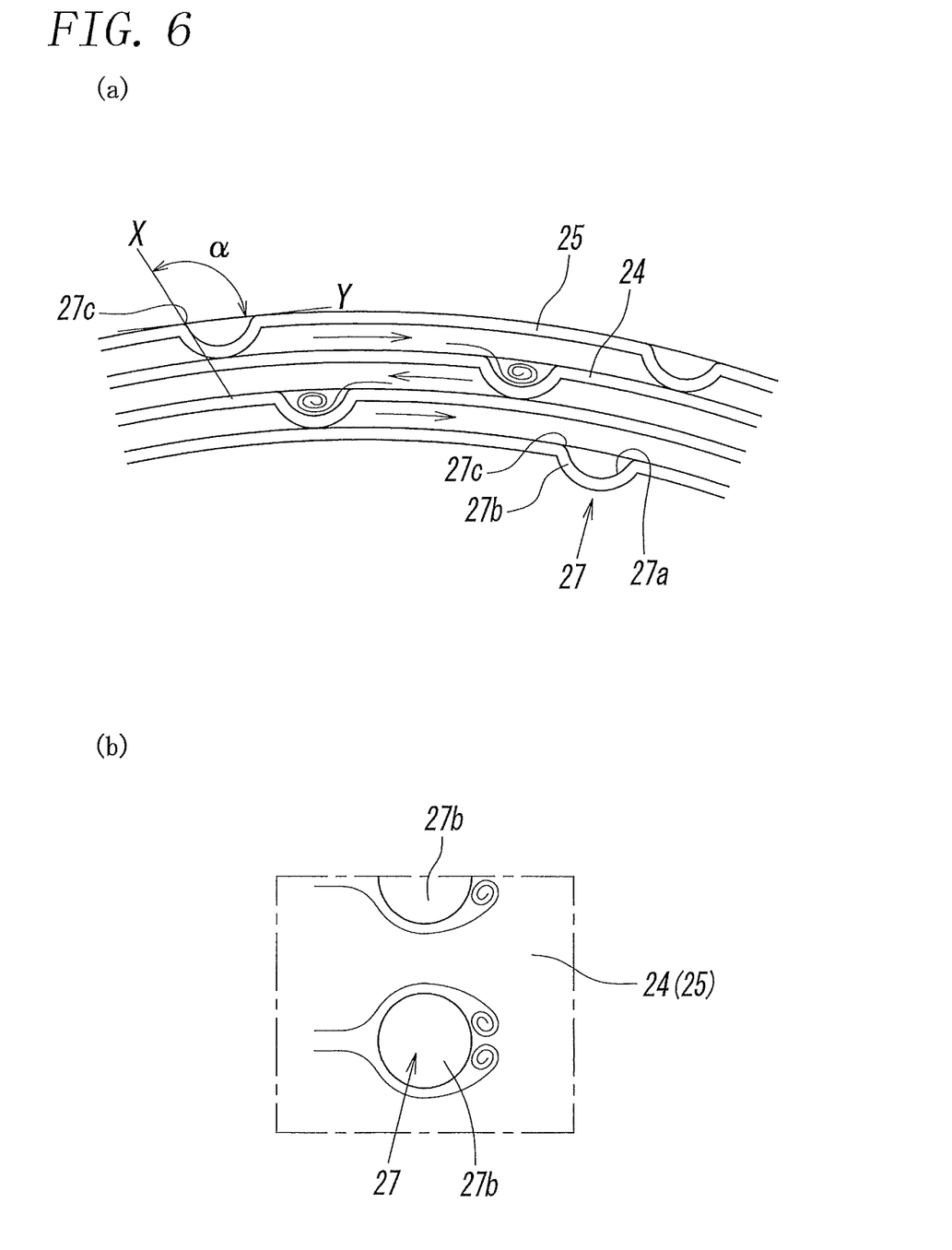
FIG. 6 illustrates a cross section of convex fins of the heat exchanger and schematic flows of compressed air around the convex fins.

As illustrated in FIGS. 4 to 6, each of the heat transfer walls 24 and 25 has a plurality of hollow convex fins 27 each of which is made by forming a recess 27a in one surface (outer surface in the figure) thereof and forming a projection 27b on the other surface (inner surface in the figure) thereof facing toward the opposite side. The convex fins 27 are substantially evenly distributed in the entireties of the heat transfer walls. As illustrated in FIGS. 6(a) and 6(b), the convex fins 27 generate eddy currents of compressed air in the recesses 27a and around the projection 27b, and agitate flows of compressed air in the inlet flow path 21 and the outlet flow path 22, thereby mainly improving the efficiency in heat exchange between compressed air that flows in the flow path 21 and compressed air that flows in the flow path 22. Tips of the convex fins 27, that is, tips of the projections 27b are in contact with the heat transfer walls 24 and 25, which are adjacent in the radial direction, and maintain the gap between the heat transfer walls 24 and 25, that is, the heights of the inlet flow path 21 and the outlet flow path 22.

An inner surface of the recess 27a of each of the convex fins 27 has a substantially spherical shape, and an opening edge 27c of the convex fin 27 is chamfered in a substantially circular shape. The crossing angle α between the inner surface of the recess 27a and the one surface of the heat transfer walls 24 and 25 at the opening edge 27c is an obtuse angle larger than 90 degree. The depth of the recess 27a is smaller than the radius of the opening edge 27c. The convex fins 27 are formed by press-forming metal plates that form the heat transfer walls 24 and 25. By forming the angle α as an obtuse angle, generation of a crack at the opening edge 27c during press-forming can be prevented.

Figure 7:
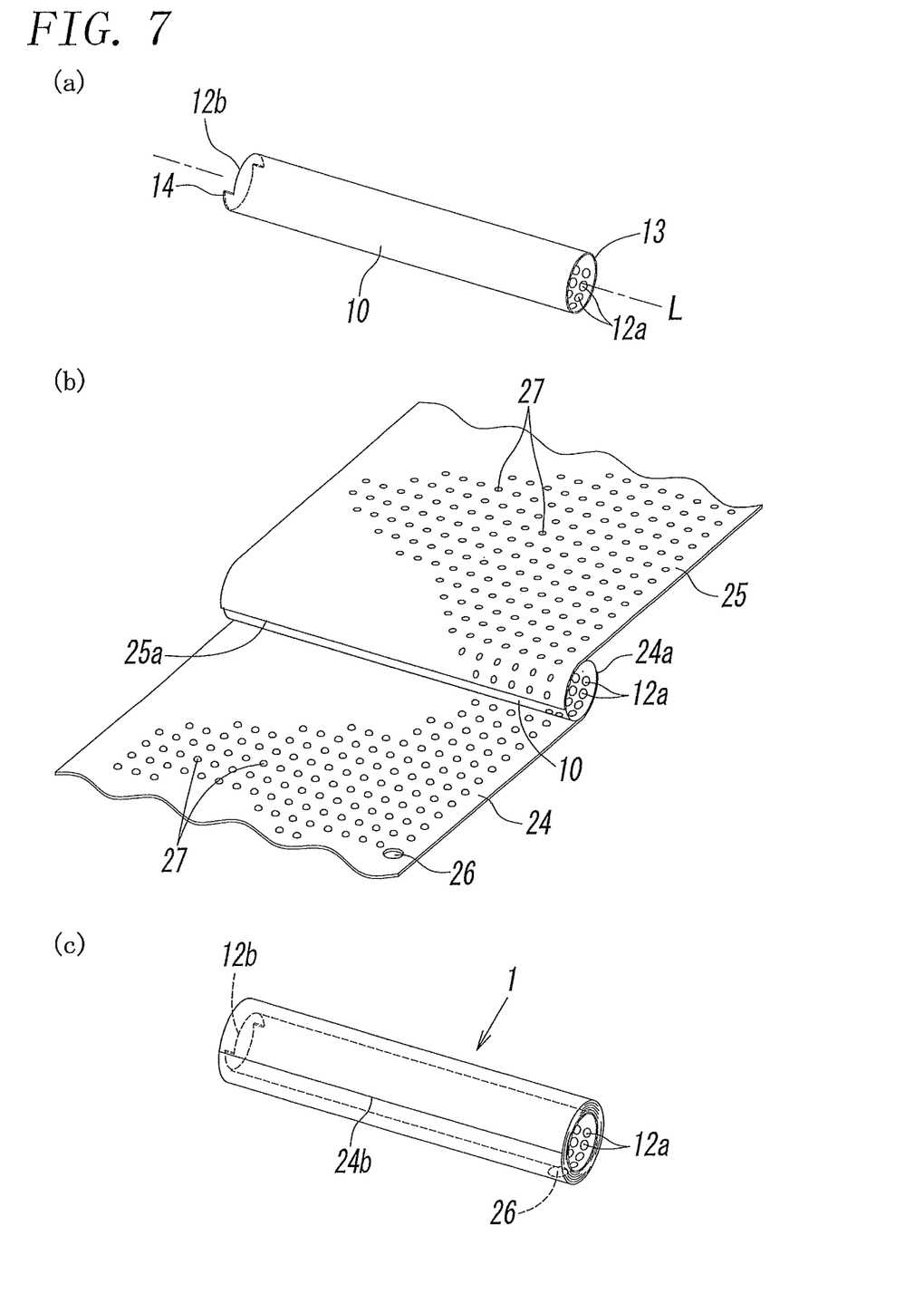
FIGS. 7(a) to 7(c) are schematic views illustrating a method of manufacturing the heat exchanger according to the present invention.

Referring to FIG. 7, an example of a method of manufacturing the heat exchanger 1 will be described. As illustrated in FIG. 7(a), a cylindrical pipe that opens at the first end 13, which is one end in the axis-L direction, and at the second end 14, which is the other end in the axis-L direction, is prepared. Assuming that the peripheral wall of the cylindrical pipe is divided into two at the plane P (FIG. 4), the flow path pipe 10 is formed as follows: on the first end 13 side of the cylindrical pipe, the plurality of circular inflow openings 12a (for example, six openings in the circumferential direction in each of two rows in the axis-L direction) are formed in a peripheral wall portion in one angular range (of 180 degrees); and on the second end 14 side of the cylindrical pipe, the outflow opening 12b, which is cut out in a sectoral shape in the circumferential direction, is formed in a peripheral wall portion in the other angular range (of 180 degrees) with a constant width from the second end 14.

By press-forming two metal plates, the convex fins 27 are formed, for example, in a grid pattern as in the present embodiment, in a staggered pattern, or the like in a state of being substantially evenly distributed. The inlet opening 26 is formed in one of the metal plates to be used as the first heat transfer wall 24, and the other metal plate is used as the second heat transfer wall 25.

Next, as illustrated in FIG. 7(b), the inner ends 24a and 25a of the first and second heat transfer walls 24 and 25 are hermetically fixed to the peripheral wall of the flow path pipe 10 at positions on the plane P by welding or the like. Then, the heat transfer walls 24 and 25 are wound multiple times around the outer periphery of the flow path pipe 10 in a state of being superposed on each other so that the first heat transfer wall 24 covers the outer peripheral surface of the flow path pipe 10 in the angular range in which the inflow openings 12a are formed and so that the second heat transfer wall 25 covers the outer peripheral surface of the flow path pipe 10 in the angular range in which the outflow opening 12b is formed. At this time, the heat transfer walls 24 and 25 are wound so that the convex fins 27 of both of these walls protrude inward. Next, as illustrated in FIG. 7(c), the first outer end 24b of the first heat transfer wall 24 is hermetically fixed to the outer peripheral surface of the second heat transfer wall 25, which is adjacent to the inside thereof, by welding or the like. Thus, the heat exchanger 1 is manufactured.

Next, the case 30 will be described in detail. As can be clearly seen from FIGS. 2 to 5, the case 30 includes a cylindrical case body 31 for containing the heat exchanger 1 and the evaporator 3, a first cap member 32 that is hermetically fixed to a first end 31a of the case body 31 in the axis-L direction by welding or the like, and a second cap member 33 that is hermetically fixed to a second end 31b by welding or the like.

The first cap member 32 includes, on the first end 31a side of the case body 31, a tubular first inner cap 35 that is fitted onto an outer peripheral part of the heat exchange flow path portion 20, and a hollow first outer cap 36 that contains the first inner cap 35. A first space 51, which has an annular shape around the axis L, is formed between the first outer cap 36 and the first inner cap 35. The first outer cap 36 is formed by integrally coupling a dome-shaped end wall 36b, which bulges outward in the axis-L direction, to a peripheral edge on one end side of a cylindrical peripheral wall 36a and by opening the other end side. In the peripheral wall 36a, the input port 41, which communicates with the first space 51, is formed in a plane Q direction (upward direction in the figure) perpendicular to the plane P, as with the output port 42.

Moreover, two insertion holes 36c are formed in the end wall 36b of the first outer cap 36 along the axis L. The insertion holes 36c are used to fix a pair of refrigerant pipes 110 of the evaporator 3 in a state of being hermetically inserted thereinto. The first outer cap 36 further includes a cylindrical tubular separation wall 44. One end part of the tubular separation wall 44 is hermetically fixed to an inner surface of the end wall 36b so as to surround the insertion holes 36c by welding or the like, and the other end part of the tubular separation wall 44 is tightly fitted into the first end 13 of the flow path pipe 10. That is, the tubular separation wall 44 substantially hermetically isolates the main heat transfer flow path 11 of the flow path pipe 10 and the first space 51 from each other.

The second cap member 33 includes, on the second end 31b side of the case body 31, a tubular second inner cap 37 that is fitted onto an outer peripheral part of the heat exchange flow path portion 20, and a hollow second outer cap 38 that contains the second inner cap 37. A second space 52 is formed between the second outer cap 38 and the second inner cap 37. The second outer cap 38 is formed by integrally coupling a dome-shaped end wall 38b, which bulges outward in the axis-L direction, to a peripheral edge on one end side of a cylindrical peripheral wall 38a and by opening the other end side. In the peripheral wall 38a, the drain discharge port 43, which communicates with the second space 52, is formed so as to face in the opposite direction (downward direction in the figure) from the input port 41 and the output port 42 on the same plane Q.

The first and second ends 31a and 31b at both ends of the case body 31 in axis-L direction are open, and the length of the case body 31 in the axis-L direction is smaller the length of the heat exchanger 1 in the axis-L direction. Therefore, the heat exchanger 1 is inserted into the case body 31 in a state in which both ends thereof protrude from the first and second ends 31a and 31b. Protruding portions at both ends of the heat exchanger 1 are respectively fitted into the first inner cap 35 and the second inner cap 37 of the first cap member 32 and the second cap member 33.

The inside diameter of the case body 31 is larger than the outside diameter of the heat exchanger 1, that is, the outside diameter of the heat exchange flow path portion 20. Therefore, the third space 53, which communicates with the outlet opening 29 of the heat exchanger 1, is formed between the case body 31 and the heat exchanger 1 in an annular shape around the axis L. The output port 42, which communicates with the third space 53, is formed in a peripheral wall of the case body 31. The third space 53 is hermetically isolated from the first space 51 in the first cap member 32 and the second space 52 in the second cap member 33, which are adjacent on both sides thereof in the axis-L direction, by a first separation wall 35b of the first inner cap 35 of the first cap member 32 and a second separation wall 37b of the second inner cap 37 of the second cap member 33.

In the first cap member 32, both ends of the first inner cap 35 are open. The first separation wall 35b, which has a flange-like shape standing in a direction perpendicular to the axis L, is integrally formed at an end edge of the cylindrical first side wall 35a located on the case body 31 side. An outer edge part of the first separation wall 35b is hermetically fixed to the first end 31a of the case body 31 by welding or the like. As illustrated in FIG. 3(a), the outer edge part of the first separation wall 35b may be hermetically fixed to both of the first end 31a of the case body 31 and the open end of the first outer cap 36 in a state of being interposed between the first end 31a and the open end. A through-hole 39 extends through the first side wall 35a. When the first inner cap 35 is fitted onto the heat exchange flow path portion 20, the through-hole 39 overlaps the inlet opening 26 of the first heat transfer wall 24, and the inlet opening 26 communicates with the first space 51. As a result, the input port 41 communicates with the inlet opening 26 through the first space 51.

Moreover, in the first inner cap 35, at an end part of the cylindrical first side wall 35a on the opposite side from the first separation wall 35b, a first closing wall 23a, for hermetically closing the entirety of one surface of the heat exchange flow path portion 20 of the heat exchanger 1 (that is, the entirety of one end opening of the inlet flow path 21 and the outlet flow path 22 having a spiral shape), is provided so as to have an annular shape in the inward direction. Preferably, the first closing wall 23a is hermetically fixed to the entirety of one end surface of the heat exchange flow path portion 20 by using a brazing alloy, an adhesive, or the like. In the present embodiment, an inner peripheral edge of the first closing wall 23a extends to an outer peripheral surface of the tubular separation wall 44.

In the second cap member 33, both ends of the second inner cap 37 are open. The second separation wall 37b, which has a flange-like shape standing in a direction perpendicular to the axis L, is integrally formed at an end edge of the cylindrical second side wall 37a located on the case body 31 side. An outer edge part of the second separation wall 37b is hermetically fixed to the second end 31b of the case body 31 by welding or the like. As illustrated in FIG. 3(b), the outer edge part of the second separation wall 37b may be hermetically fixed to both of the second end 31b of the case body 31 and the open end of the second outer cap 38 in a state of being interposed between the second end 31b and the open end.

Moreover, in the second inner cap 37, at an end part of the cylindrical second side wall 37a on the opposite side from the second separation wall 37b, a second closing wall 23b, for hermetically closing the entirety of the other surface of the heat exchange flow path portion 20 of the heat exchanger 1 (that is, the entirety of the other end opening of the inlet flow path 21 and the outlet flow path 22 having a spiral shape), is provided so as to have an annular shape in the inward direction. Preferably, the second closing wall 23b is hermetically fixed to the entirety of the other end surface of the heat exchange flow path portion 20 by using a brazing alloy, an adhesive, or the like. An inner peripheral edge of the second closing wall 23b is slightly bent along the axis L in a direction toward the first end 13 and is fitted into the second end 14 of the flow path pipe 10 of the heat exchanger 1. Thus, the second opening 16 of the second end 14 of the flow path pipe 10 communicates with the drain discharge port 43 through the second inner cap 37 and the second space 52.

The case body 31, the first inner cap 35 of the first cap member 32, the second inner cap 37 of the second cap member 33, and the first and second outer caps 36 and 38 may each be made of a metal such as a stainless steel, a synthetic resin, or a combination of a synthetic resin and a metal.

Next, referring to FIGS. 1 and 3 to 5, the operational effects of the dehumidification unit 2 will be described in detail.

Compressed air to be dehumidified, which has flowed into the first space 51 from the input port 41 connected to an air pressure source such as a compressor, is introduced into the inlet flow path 21 of the heat exchange flow path portion 20 through the inlet opening 26. As illustrated in FIGS. 4 and 5, the compressed air introduced into the inlet flow path 21 flows in the heat exchange flow path portion 20 in the inward direction while spirally rotating. During this time, the compressed air to be dehumidified, which flows in the inlet flow path 21, exchanges heat with compressed air after dehumidification, which flows in the adjacent outlet flow path 22 in a direction opposite to the compressed air in the inlet flow path 21. At this time, because compressed air after dehumidification is cooled in the main heat transfer flow path 11 and has a lower temperature than compressed air before dehumidification, the compressed air in the inlet flow path 21 is preliminarily cooled, that is, pre-cooled. The pre-cooling of the compressed air is pre-cooling with respect to main cooling in the main heat transfer flow path 11. The pre-cooled compressed air flows into the first end 13 side of the main heat transfer flow path 11 through the inflow openings 12*a*.

Compressed air to be dehumidified, which has flowed into the main heat transfer flow path 11, is cooled by flowing toward the second end 14 side while exchanging heat with a refrigerant that flows in the refrigerant pipe 110 of the evaporator 3. At this time, water (water vapor) included in the compressed air condenses to become drain water and is removed from the compressed air. The compressed air, which is dehumidified in this way and has low temperature, flows into the outlet flow path 22 of the heat exchange flow path portion 20 through the outflow opening 12*b* formed near the second end 14 of the flow path pipe 10. On the other hand, the drain water is pushed by compressed air that flows in the main heat transfer flow path 11 and flows toward the second end 14 of the flow path pipe 10, and is guided to the second space 52 formed in the second cap member 33 through the second opening 16 at the second end 14. Then, the drain water falls in the second space 52 by gravity, is discharged to the outside of the dehumidification unit 2 through the drain discharge port 43 formed at the bottom of the second outer cap 38 of the case 30, and is accumulated in the auto-drain 109 connected to the drain discharge port 43. Then, for example, by using an appropriate parameter, such as the amount of drain water accumulated in the auto-drain 109 or time, as a trigger, a valve (not shown) disposed in the auto-drain 109 opens, and the accumulated drain water is discharged from the auto-drain 109 by the pressure of compressed air.

Low-temperature compressed air after dehumidification, which has flowed into the outlet flow path 22, flows in the outward direction in the heat exchange flow path portion 20 while spirally rotating. During this time, the compressed air after dehumidification, which flows in the outlet flow path 22, is reheated by exchanging heat with compressed air before dehumidification, which flows in the adjacent inlet flow path 21 in a direction opposite to the compressed air in the outlet flow path 22. The reheated compressed air after dehumidification flows into the third space 53 through the outlet opening 29 and is output to an external air-pressure device or the like through the output port 42. Thus, by reheating compressed air after dehumidification, occurrence of dew condensation in the air-pressure device, to which the compressed air is output, can be prevented.

As described above, with the heat exchanger 1 and the dehumidification unit 2 provided with the heat exchanger 1, the heat exchange flow path portion 20 is formed by alternately winding the two spirally-shaped first and second heat transfer walls 24 and 25 around the outer periphery of the cylindrical flow path pipe 10 of the main heat transfer flow path 11 with a predetermined gap interposed therebetween in the radial direction of the flow path pipe 10. The inlet flow path 21 and the outlet flow path 22, for introducing compressed air into and discharging compressed air from the flow path pipe 10, are alternately formed, in the radial direction, from the gap between the heat transfer walls 24 and 25. Therefore, while maintaining high efficiency in heat exchange between flows of compressed air by using counter flows in the heat exchange flow path portion 20, it is possible to realize more efficient flow path arrangement for compressed air by avoiding complexity in flow path arrangement, and, as a result, it is possible to realize reduction in the size of the heat exchanger 1 and the dehumidification unit 2.

Heretofore, a heat exchanger, a dehumidification unit, and a dehumidification system according to an embodiment of the present invention have been described. The present invention is not limited to the embodiment described above, and it is needless to say that various design modifications can be made within the scope of the claims.

Figure 8:
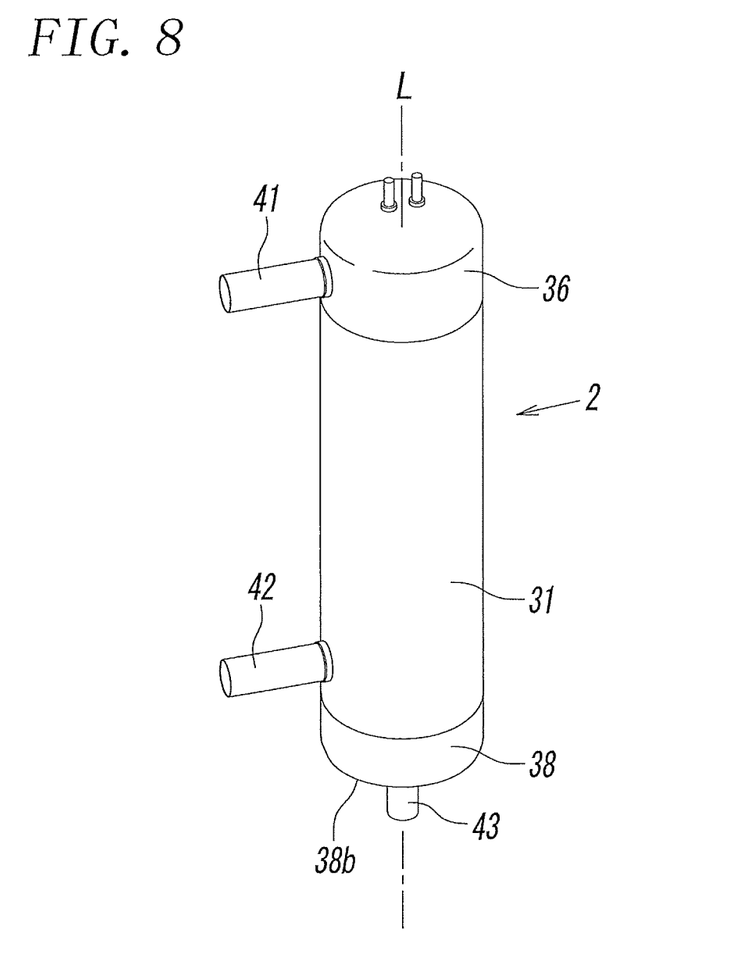
FIG. 8 is a schematic external perspective view illustrating a modification of the dehumidification unit according to the present invention.

For example, the embodiment of the dehumidification unit 2 described above is used in a state in which the axis L is horizontal. However, the dehumidification unit 2 is not limited to this. As illustrated in FIG. 8, the drain discharge port 43 may be formed in the end wall 38*b* the second outer cap 38 on the axis L, and the dehumidification unit 2 may be used in a state in which the axis L is vertical.

In the embodiment of the dehumidification unit 2, an evaporator formed of the refrigerant pipe 110 is used as a cooling heat source 3. However, a heat source 3 using a different cooling method may be used. The heat exchanger 1 can be used, not only for cooling and dehumidification, but also for heating.

Moreover, in the embodiment of the dehumidification unit 2 described above, the positions of the input and output ports 41 and 42 can be interchanged, or the positions of the inlet flow path 21 and the outlet flow path 22 of the heat exchange flow path portion 20 can be interchanged.

In the embodiment described above, the heat exchange flow path portion 20 is formed by fixing the inner ends 24*a* and 25*a* of the two plate-shaped heat transfer walls 24 and 25 to the outer peripheral surface of the flow path pipe 10 and by spirally winding the heat transfer walls 24 and 25 around the flow path pipe 10. However, the flow path pipe 10 and the two spirally-shaped heat transfer walls 24 and 25 may be integrally formed by extrusion. In this case, the convex fins 27 may be composed of, instead of the recesses 27*a* and the projections 27*b* as in the embodiment, for example, grooves and linear protrusions that extend along the axis L. However, the height of the convex fins 27 is smaller than the height of the inlet flow path 21 and the outlet flow path 22 in order not to disturb flow of compressed air.

REFERENCE SIGNS LIST 1 heat exchanger
2 dehumidification unit
3 heat source (evaporator)
10 flow path pipe
11 main heat transfer flow path (main cooling flow path)
12a inflow opening
12b outflow opening
13 first end
14 second end
20 heat exchange flow path portion
21 inlet flow path
22 outlet flow path
24 first heat transfer wall
24a first inner end
24b first outer end
25 second heat transfer wall
25a second inner end
25b second outer end
26 inlet opening
27 convex fin
27a recess
27b projection
27c opening edge
29 outlet opening
30 case
35b first separation wall
37b second separation wall
41 input port
42 output port
43 drain discharge port
51 first space
52 second space
53 third space
100 dehumidification system
101 refrigeration circuit
103 compressor
104 condenser
105 capillary tube (decompressor)
109 auto-drain
110 refrigerant pipe
P, Q plane
L axis

The invention claimed is:

1. A compressed air heat exchanger, the heat exchanger comprising:
a cylindrical flow path pipe that includes a first end at one end in an axial direction and a second end at the other end in the axial direction and that causes heat exchange to be performed between a heat source and compressed air in a main heat transfer flow path inside thereof; and
a heat exchange flow path portion that includes an inlet flow path for introducing compressed air from an outside into the main heat transfer flow path and an outlet flow path for discharging compressed air after heat exchange to the outside from the main heat transfer flow path and that causes heat exchange to be performed between compressed air that flows in the inlet flow path and compressed air that flows in the outlet flow path,
wherein the heat exchange flow path portion includes a first heat transfer wall and a second heat transfer wall each of which has a spiral shape, an inner end of each of the first heat transfer wall and the second heat transfer wall is hermetically fixed to an outer periphery of the flow path pipe, the first heat transfer wall and the second heat transfer wall are alternately wound around the outer periphery of the flow path pipe in a state in which a predetermined gap is interposed therebetween, and the inlet flow path and the outlet flow path are alternately formed from the gap between the first heat transfer wall and the second heat transfer wall,
wherein, in an outer peripheral part of the heat exchange flow path portion, an inlet opening for allowing compressed air from the outside to flow into the inlet flow path and an outlet opening for allowing compressed air to flow out from the outlet flow path are formed, and
wherein an inflow opening through which the inlet flow path and the main heat transfer flow path communicate with each other is formed on the first end side of the flow path pipe, and an outflow opening through which the main heat transfer flow path and the outlet flow path communicate with each other is formed on the second end side of the flow path pipe.

2. The heat exchanger according to claim 1,
wherein each of the first heat transfer wall and the second heat transfer wall includes a plurality of convex fins each of which is made by forming a recess in one of inner and outer surfaces thereof and forming a projection on the other surface thereof.

3. The heat exchanger according to claim 2,
wherein an opening edge of the recess of each of the convex fins is chamfered in a substantially circular shape, and an angle between an inner surface of the recess and the one surface of the heat transfer wall at the opening edge is larger than 90 degrees, and a depth of the recess is smaller than a radius of the opening edge.

4. The heat exchanger according to claim 1,
wherein the inner ends of the first heat transfer wall and the second heat transfer wall are fixed to the outer periphery of the flow path pipe so as to be separated from each other by 180 degrees, and outer ends of the first heat transfer wall and the second heat transfer wall are disposed in an outer peripheral part of the heat exchange flow path portion so as to be separated from each other by 180 degrees.

5. The heat exchanger according to claim 4,
wherein the inner ends and the outer ends of the first heat transfer wall and the second heat transfer wall are disposed on a same plane that includes an axis of the flow path pipe, and the inflow opening and the outflow opening are respectively formed in one angular range and the other angular range in the flow path pipe that are located with the plane interposed therebetween.

6. A dehumidification unit for dehumidifying compressed air,
the dehumidification unit comprising: a cooling heat source; a heat exchanger for reheating compressed air, cooled and dehumidified by the cooling heat source, by heat exchange with compressed air before dehumidification; and a hollow case in which the heat exchanger and the cooling heat source are contained,
wherein the heat exchanger includes
a cylindrical flow path pipe that includes a first end at one end in an axial direction and a second end at the other end in the axial direction and in which the cooling heat source is disposed in a main heat transfer flow path inside thereof, and
a heat exchange flow path portion that includes an inlet flow path for introducing compressed air from an outside into the main heat transfer flow path and an outlet flow path for discharging compressed air after dehumidification, cooled in the main heat transfer flow path, to the outside and that causes heat exchange to be performed between compressed air that flows in the inlet flow path and compressed air that flows in the outlet flow path, wherein the heat exchange flow path portion includes a first heat transfer wall and a second heat transfer wall each of which has a spiral shape, an inner end of each of the first heat transfer wall and the second heat transfer wall is hermetically fixed to an outer periphery of the flow path pipe, the first heat transfer wall and the second heat transfer wall are alternately wound around the outer periphery of the flow path pipe in a state in which a predetermined gap is interposed therebetween, and the inlet flow path and the outlet flow path are alternately formed from the gap between the first heat transfer wall and the second heat transfer wall, wherein, in an outer peripheral part of the heat exchange flow path portion, an inlet opening for allowing compressed air to be dehumidified to flow into the inlet flow path and an outlet opening for allowing compressed air after dehumidification to flow out from the outlet flow path are formed, wherein an inflow opening through which the inlet flow path and the main heat transfer flow path communicate with each other is formed on the first end side of the flow path pipe, and an outflow opening through which the main heat transfer flow path and the outlet flow path communicate with each other is formed on the second end side of the flow path pipe, and wherein, in the case, an input port that communicates with the inlet opening of the heat exchanger, an output port that communicates with the outlet opening of the heat exchanger, and a drain discharge port that communicates with the second end side of the main heat transfer flow path and through which drain water generated in the heat exchanger is discharged to the outside are formed.

7. The dehumidification unit according to claim 6,
wherein a hollow space is formed between a periphery of the heat exchanger and the case, and the hollow space is divided by a first separation wall and a second separation wall into three spaces, which are a first space on the first end side, a second space on the second end side, and a third space interposed between the first space and the second space, and wherein one of connection between the input port and the inlet opening and connection between the output port and the outlet opening is made via the first space and the other of the connections is made via the third space, and the second end side of the main heat transfer flow path is connected to the drain discharge port via the second space.

8. The dehumidification unit according to claim 7,
wherein the input port and the output port are disposed at positions higher than the drain discharge port.

9. The dehumidification unit according to claim 7,
wherein the input port and the inlet opening are connected via the first space, and the output port and the outlet opening are connected via the third space, wherein an outer end of the first heat transfer wall is hermetically fixed to the second heat transfer wall adjacent to an inside of the first heat transfer wall, and the inlet opening is formed in an outermost wall portion of the first heat transfer wall disposed on an outermost side, and wherein the outlet opening is formed from a gap formed between an outer end of the second heat transfer wall and the first heat transfer wall adjacent to an inside of the outer end.

10. The dehumidification unit according to claim 6,
wherein the inner end of the first heat transfer wall and the inner end of the second heat transfer wall are fixed to the outer periphery of the flow path pipe so as to be separated from each other by 180 degrees, and an outer end of the first heat transfer wall and an outer end of the second heat transfer wall are disposed in an outer peripheral part of the heat exchange flow path portion so as to be separated from each other by 180 degrees.

11. The dehumidification unit according to claim 10,
wherein the inner end and the outer end of the first heat transfer wall and the inner end and the outer end of the second heat transfer wall are disposed on a single plane that includes an axis of the flow path pipe, and the inflow opening and the outflow opening are respectively formed in one angular range and the other angular range in the flow path pipe that are located with the plane interposed therebetween.

12. The dehumidification unit according to claim 11,
wherein the outflow opening is formed in an angular range of the flow path pipe that is located on an opposite side from the drain discharge port with the plane interposed therebetween.

13. The dehumidification unit according to claim 6,
wherein the cooling heat source is a refrigerant pipe that is inserted into the main heat transfer flow path from the first end of the flow path pipe and through which a refrigerant flows.

14. A dehumidification system provided with the dehumidification unit according to claim 13, the dehumidification system comprising:
a refrigeration circuit that causes a refrigerant decompressed by a decompressor to flow to the refrigerant pipe, and that circulates a refrigerant that has performed heat exchange with compressed air in the main heat transfer flow path by causing the refrigerant to flow to the decompressor again through a compressor and a condenser, wherein an auto-drain is connected to the drain discharge port of the dehumidification unit.

* * * * *